Figure 1:
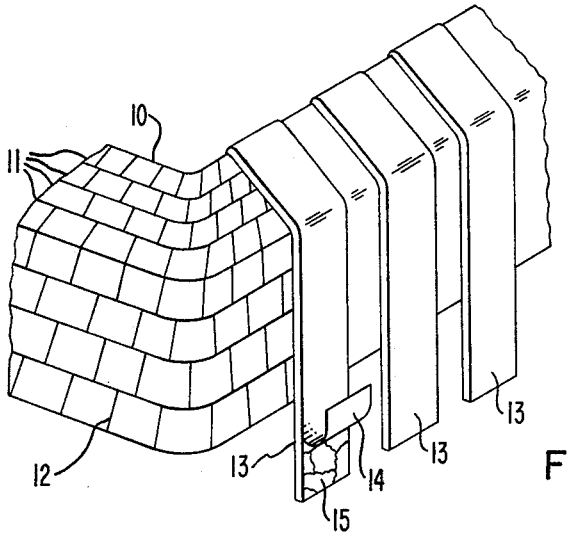
Figure 2:
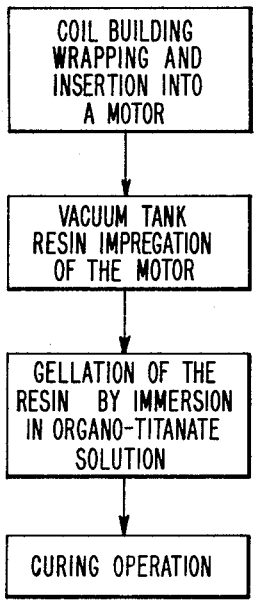

United States Defensive Publication [19] (H) [11] T102,503

Simmonds et al. [43] Dec. 7, 1982

[54] ORGANO-TITANATE GELLATION OF EPOXY RESIN COATED ARTICLES

[76] Inventors: Leonard B. Simmonds, 125 Kelvington Dr., Monroeville, Pa. 15146; James D. B. Smith, 104 Briaridge Dr., Turtle Creek, Pa. 15145; Richard L. Oblich, 108 Timber La., Trafford, Pa. 15085

[21] Appl. No.: 331,429

[22] Filed: Dec. 16, 1981

Related U.S. Application Data

[63] Continuation of Ser. No. 967,808, Dec. 8, 1978, abandoned.

[51] Int. Cl.[3] ..... B05D 5/12

[52] U.S. Cl. ..... 427/116; 427/333; 427/340; 427/341; 427/386; 427/430.1; 427/435

[57] ABSTRACT

An article, such as a mica wrapped coil, a dynamo-electric machine component containing mica wrapped coils, or a metal substrate, is insulated by: (A) applying wet epoxy resin to the article, (B) contacting the wet epoxy resin with a titanate solution, for a time effective to form a resin impervious, gelled epoxy skin on the surface of the epoxy resin, where the titanate solution consists essentially of organo-titanate and an organic, non-polar solvent, where the weight ratio of organo-titanate:organic non-polar solvent is from 1:2.5 to 1:99, and (C) curing the epoxy resin.

10 Claims, 1 Sheet Drawing,

24 Pages Specification

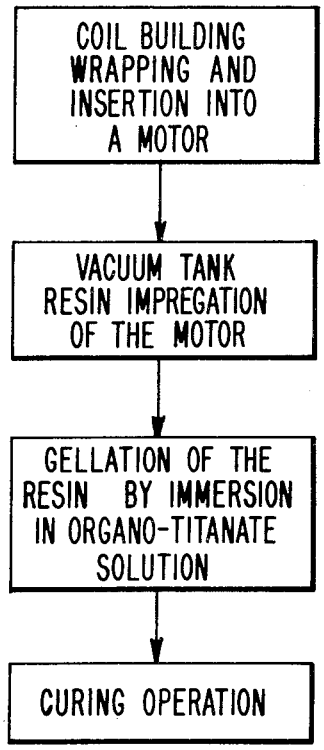

The file of this unexamined application may be inspected and copies thereof may be purchased (849 O.G. 1221, Apr. 9, 1968).